United States Patent
Kumar (10) Patent No.: US 8,543,942 B1
(45) Date of Patent: Sep. 24, 2013

(54) METHOD AND SYSTEM FOR TOUCH-FRIENDLY USER INTERFACES

(75) Inventor: Mayank Kumar, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 423 days.

(21) Appl. No.: 12/856,259

(22) Filed: Aug. 13, 2010

(51) Int. Cl.
*G06F 3/048* (2013.01)
*G06F 3/00* (2006.01)

(52) U.S. Cl.
USPC .......................... 715/835; 715/711; 715/713

(58) Field of Classification Search
USPC .......................................... 715/835, 711, 713
See application file for complete search history.

(56) References Cited

U.S. PATENT DOCUMENTS

| | | | |
|---|---|---|---|
| 5,905,496 A * | 5/1999 | Lau et al. ....................... | 715/835 |
| 6,958,749 B1 * | 10/2005 | Matsushita et al. ........... | 345/175 |
| 7,602,382 B2 * | 10/2009 | Hinckley et al. .............. | 345/173 |
| 7,685,519 B1 * | 3/2010 | Duncan et al. ................ | 715/711 |
| 2004/0237048 A1 * | 11/2004 | Tojo et al. ..................... | 715/745 |
| 2007/0079258 A1 * | 4/2007 | Hsieh et al. ................... | 715/853 |
| 2008/0042988 A1 * | 2/2008 | Westerman et al. .......... | 345/173 |
| 2008/0122796 A1 * | 5/2008 | Jobs et al. ..................... | 345/173 |
| 2011/0018811 A1 * | 1/2011 | Miernik ........................ | 345/173 |

* cited by examiner

*Primary Examiner* — David Phantana Angkool
(74) *Attorney, Agent, or Firm* — Kilpatrick Townsend & Stockton (57) ABSTRACT

A computing device has a processor executing instructions to provide a graphical user interface rendered on a display device, the user interface includes a first control rendered on the display device and a second control rendered on the display device, wherein, by receiving input through the user interface of a selection within a proximity of at least one of the first control and the second control, the computing device renders at least one supplemental control on the display device corresponding to the selection.

23 Claims, 6 Drawing Sheets

METHOD AND SYSTEM FOR TOUCH-FRIENDLY USER INTERFACES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Graphical user interfaces of mobile computing devices have controls that users may interact with, for example text fields a user may enter text in, buttons a user may click, icons a user may select, or radio buttons a user may select. Generally, for a user to interact with a control, the user's selection must substantially superimpose upon the displayed control. Due to the display size of many mobile devices, it may be difficult for a user to interact with controls in a distinctive manner. The controls may be small in size and located in close proximity. Thus, a user's selection may interact with an unintended control.

This problem is compounded for touch-display mobile devices (i.e., touch screen devices), such as smartphones (e.g., APPLE® IPHONE®, MOTOROLA® DROID X or other GOOGLE® ANDROID® based phones, etc.) or tablets (e.g., APPLE® IPAD®, AMAZON® KINDLE®, etc.). On touch-display mobile devices, a user's touch gesture must substantially superimpose upon the displayed control. This can make it difficult for a user to interact with controls on touch-display mobile devices. This is especially true for user interfaces that were not initially designed as content for touch-display mobile devices, for example legacy ADOBE® FLEX® or ADOBE® FLASH® applications and legacy web content. Further, even for content designed specifically for touch-display mobile devices, due to different users having varying touch gesture characteristics (e.g., fingerprint size, fingernail length, precision and consistency of a user's gestures, etc.), controls must generally be large and spaced apart from each other. This greatly reduces the number of controls and amount of other content that can be displayed to a user.

Some user interfaces aim to reduce this inconvenience by allowing a user to zoom in to assist a user with interacting with controls. For example, on an APPLE® IPAD® or APPLE® IPHONE®, a magnifying glass that allows a user to position the curser between intended letters is displayed when text is selected. This solution, however, may be distracting to a user and may result in a loss of context of the zoomed out content. For example, a user may accidentally select the wrong text field causing the user interface to zoom in on that text field. The user may then spend time entering text in the wrong text field in a zoomed in mode and not realize it was the wrong text field until the user zooms out again due to the loss of visibility of content surrounding the text field.

Additionally, rendering zoomed in content is processor intensive and, thus, negatively impacts the battery life of mobile devices. Further, design of user interfaces optimized for touch-display mobile devices, for example having large controls sufficiently spaced to allow convenient user interaction with touch gestures, requires significant amounts of time and effort from designers.

SUMMARY

According to embodiments, a computing device has a processor executing instructions to provide a graphical user interface rendered on a display device, the user interface includes a first control rendered on the display device; and a second control rendered on the display device, wherein, by receiving input through the user interface of a selection within a proximity of at least one of the first control and the second control, the computing device renders at least one supplemental control on the display device corresponding to the selection.

While the system and method is described herein by way of example and embodiments, those skilled in the art recognize that the user interface is not limited to the embodiments or drawings described. It should be understood that the drawings and description are not intended to limit embodiments to the particular form disclosed. Rather, the intention is to cover all modifications, equivalents and alternatives falling within the spirit and scope of the invention defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Disclosed embodiments provide a method and system for improving the touch-friendliness of content on mobile devices. According to embodiments, if the coordinates of a user's selection do not substantially superimpose upon a displayed UI control, a computer-implemented method augments the selection and identifies controls which accept the selection near the user's selection.

Figure 1:
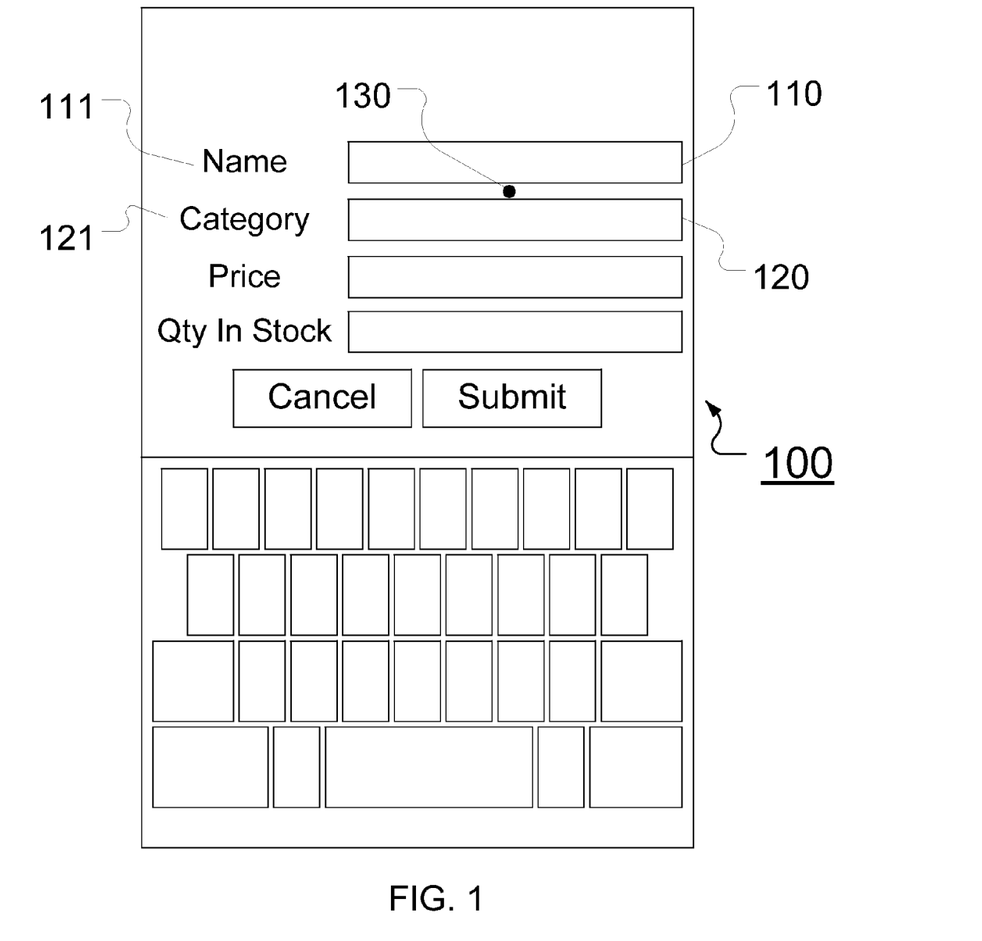
FIG. 1 illustrates an exemplary mobile device user interface ("UI").

FIG. 1 illustrates an exemplary UI 100 for a mobile device including conventional UI objects, including text and controls. UI 100 includes text field 110 labeled by text 111 as well as text field 120 labeled by text 121. In conventional UIs, for a user to enter text in either text field 110 or text field 120, the user's selection must substantially superimpose upon the respective text field. Due to the small size and close proximity of text field 110 and text field 120 on a mobile device's UI, a user may accidentally select the coordinate identified by dot 130 which ambiguously superimposes upon text field 110 and text field 120 at best. When a user's selection does not superimpose upon a UI control, a processing device (e.g., shown in FIG. 5) identifies controls proximate the user's selection. For example, for a touch-display mobile device, the processing device may identify controls proximate a user's touch gesture which accept a touch gesture (i.e., may be selected by a user touching the control rendered on the display of the touch-display device).

The processing device may identify controls within a specific proximity of the touch. This proximity may be predefined, for example, selectable controls within a half-inch of the user's selection may be identified. Of course, embodiments may have varying proximate distances. Embodiments may also allow a user to select or adjust, for example through a graphical user interface, a proximate distance. For example a user who tends to have imprecise touch gestures may select to have a greater proximate distance, such as three-quarters of an inch, so that the UI will identify all controls within three-quarters of an inch of the user's touch gesture. Alternatively, a user who tends to have precise touch gestures may select to have a lesser proximate distance, for example one-eighth of an inch, so that the UI will only identify controls within one-eighth of an inch of the user's touch gesture.

The processing device may identify any UI controls that are capable of selection by a user. For example, for a FLASH® application the processing device may identify UI controls by determining whether any UI controls derive from the flash.display.InteractiveObject class. Of course, other programming environments have similar base classes which allow the processing device to identify interactible UI controls. In such fashion, UI controls of legacy UIs, for example UIs of websites or applications not designed for implementation on mobile devices, may be identified.

Figure 2:
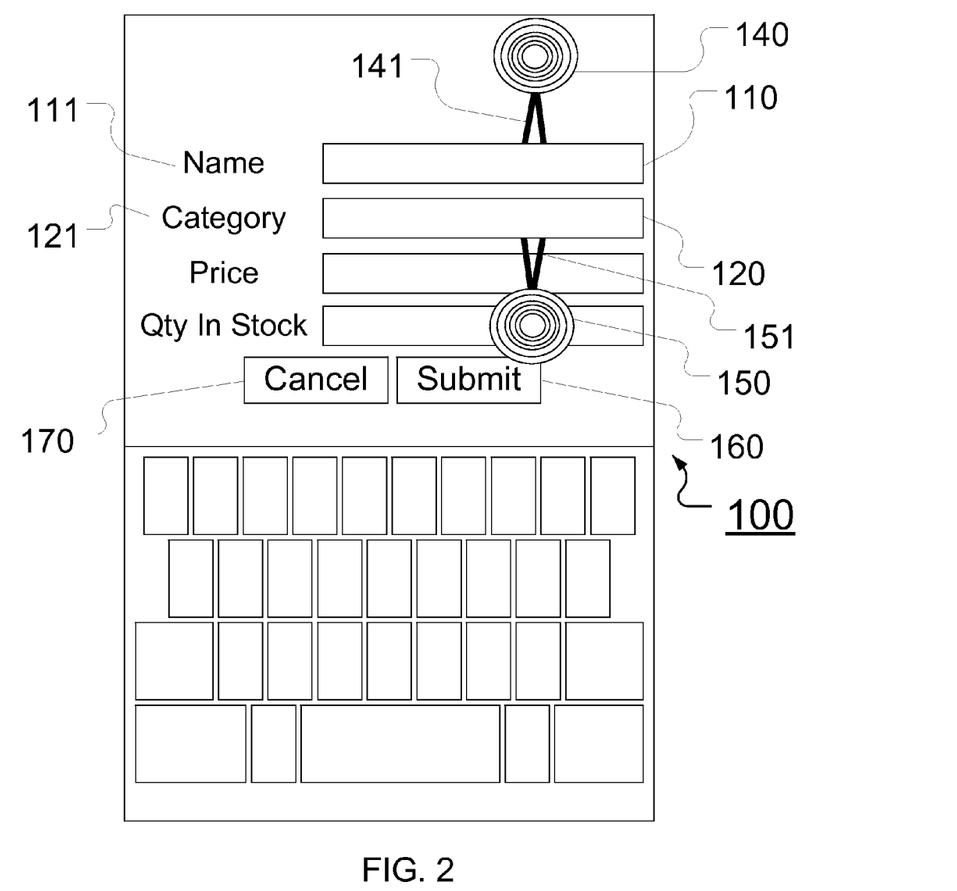
FIG. 2 illustrates an exemplary mobile device UI having supplemental controls extending from associated UI controls.

After the processing device identifies selectable controls proximate the user's selection, the UI provides supplemental touch-friendly controls to the user to allow the user to select an identified control with a touch gesture. FIG. 2 illustrates UI 100 after rendering touch-friendly controls in response to a user's selection (e.g., touch gesture) of the coordinate identified by dot 130 of FIG. 1. After the user's selection, handle 140 and handle 150 may be rendered as supplemental controls. Handle 140 corresponds to text field 110 and may be selected by a user's touch gesture to select text field 110. In like fashion, handle 150 corresponds to text field 120 and may be selected by a user's touch gesture to select text field 120. Handles 140 and 150 may be configured to be easily selectable by a user, for example by having a large central area a user may select. Handles may be arranged apart from each other to minimize the risk of a user's touch gesture mistakenly selecting an unintended handle. Also, while supplemental controls, such as handles 140 and 150, are displayed other controls may be disabled, such as text fields 110 and 120. Of course, one of ordinary skill in the art understands that disabled controls are disabled only in the sense that they may not be selected (e.g., by a touch gesture) when supplemental controls are visible, but the functionality of the disabled controls are available through selection of the supplemental controls (i.e., handle 140 or 150 may be selected to select text fields 110 or 120, respectively, when text fields 110 and 120 are disabled).

Handles corresponding to selectable supplemental controls may be configured to clearly identify the control they are associated with. For example, in FIG. 2 wedge 141 identifies to a user that handle 140 corresponds to text field 110 and wedge 151 identifies to a user that handle 150 corresponds to text field 120. Of course, the wedge is only an exemplary shape, and any line, arrow, or other shape may be used. In alternative embodiments, handles may be associated with UI controls in alternative fashions.

Figure 3:
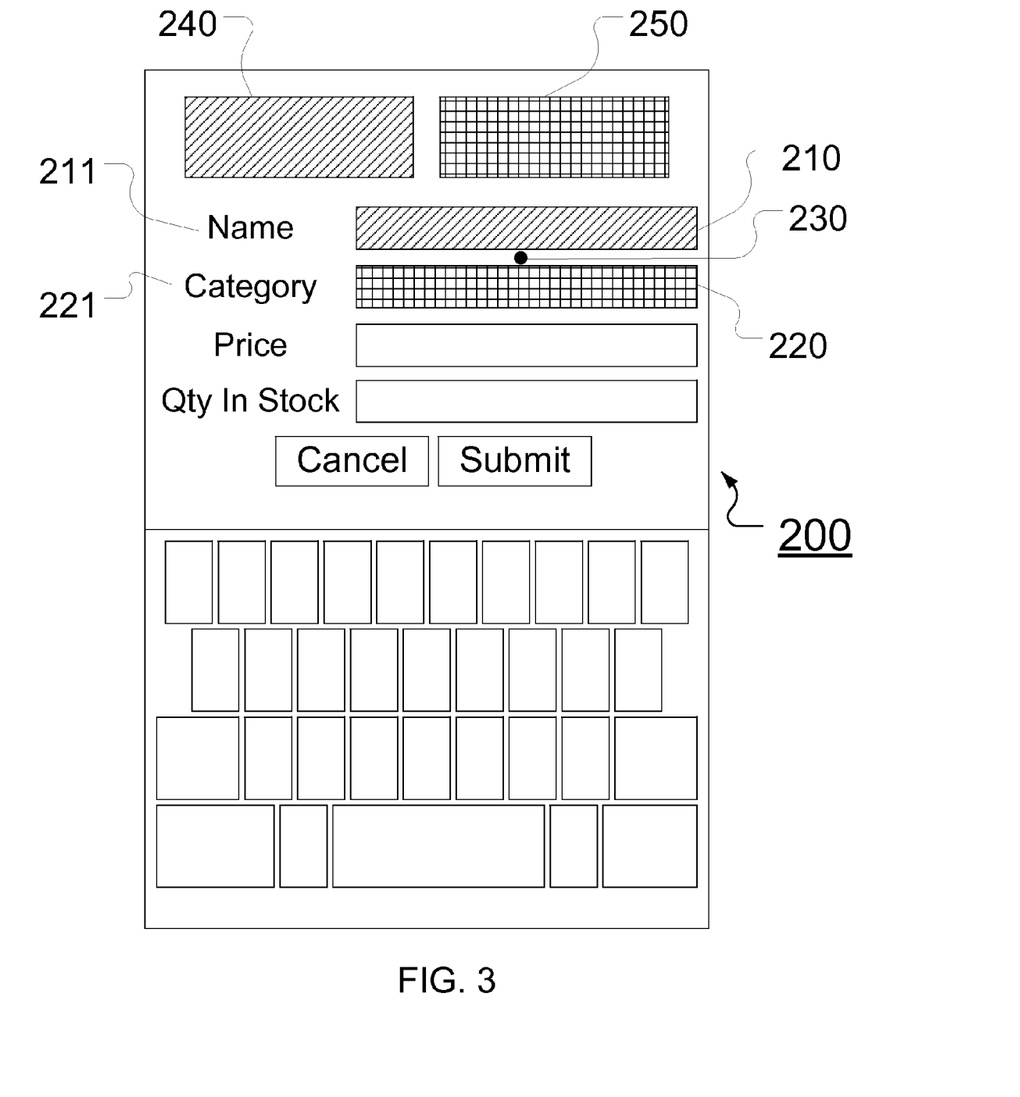
FIG. 3 illustrates an exemplary mobile device UI having alternative supplemental controls positioned remotely from associated UI controls.

For example, FIG. 3 illustrates an exemplary UI 200 that renders supplemental control 240 corresponding to text field 210 and supplemental control 250 corresponding to text field 220 when a user selects coordinate 230. UI 200 allows a user to easily identify supplemental controls that correspond to UI controls by the user identifying the pattern of a supplemental control and of respective controls. For example, supplemental control 240 and text field 210 have a first pattern rendered thereon and supplemental control 250 and text field 220 have a second pattern rendered thereon, thus allowing a user to associate supplemental control 240 with text field 210 and to associate supplemental control 250 with text field 220. Of course, while FIG. 3 shows diagonal lines as the first pattern and perpendicularly crossing lines as the second pattern, any patterns may be used. Alternatively, a supplemental control may be colored corresponding to a colored shading of a corresponding control, a supplemental control may be colored corresponding to a colored outline of a corresponding control, a supplemental control may be colored corresponding to a colored label (e.g., supplemental control 240 may be colored the same color as text 211 corresponding to text field 210), or any other visual indicia linking a supplemental control to a corresponding control may be used.

FIGS. 2 and 3 additionally illustrate that the placement of supplemental controls may vary in embodiments. Supplemental controls may be placed in any location on the UI such that they are sufficiently sized and separated to allow a user to easily and unambiguously select a supplemental control. Additionally, FIGS. 2 and 3 illustrate that the shapes of supplemental controls may vary. Of course, in addition to rounded handles 140 and 150 shown in FIG. 2 and rectangular supplemental controls 240 and 250 shown in FIG. 3, alternative supplemental controls may take any other shape, for example other polygonal shapes. Further, while handle 150 of FIG. 2 is shown rendered over (i.e., partially overlapping) a button 160, embodiments may have semi-transparent supplemental controls, thus allowing a user to see underlying objects. Supplemental controls may also vary in size, for example embodiments may have supplemental controls that cover substantially the entire display.

Figure 4:
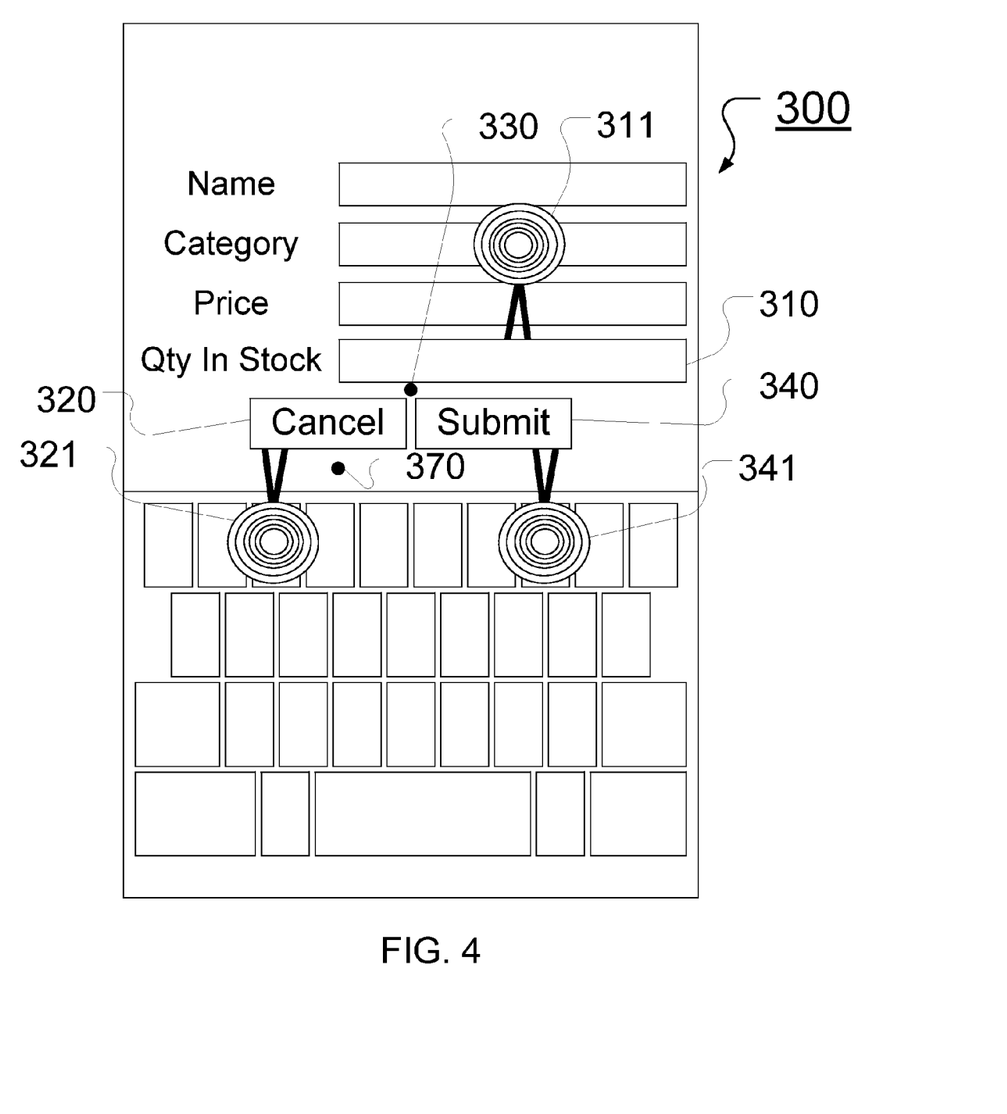
FIG. 4 illustrates an exemplary mobile device UI having three supplemental controls extending from associated UI controls.

Of course, embodiments may render more than two supplemental controls if a user's selection is proximate more than two UI controls. UI 300 shown in FIG. 4 illustrates such an embodiment. A user may accidentally select the coordinate identified by dot 330 when the user intended to select one of text field 310, submit button 340, or cancel button 320. A processing device may identify each of text field 310, submit button 340, and cancel button 320 and, thus, render supplemental control 311 corresponding to text field 310, supplemental control 341 corresponding to submit button 340, and supplemental control 321 corresponding to cancel button 320.

Additionally, as described above, the processing device may identify UI controls proximate a user's selection according to a proximate distance. In embodiments having a large proximate distance, for example three-quarters of an inch, the processing device may identify each of text field 310, submit button 340, and cancel button 320. The processing device may then render supplemental control 311 corresponding to text field 310, supplemental control 341 corresponding to submit button 340, and supplemental control 321 corresponding to cancel button 320 in response to a user selecting a coordinate identified by dot 370.

In other embodiments, the proximate distance may iteratively improve using characteristics of user input information, for example the size of a user's touch gesture or the location of a user's selection in relation to the control the user intended to select. For example, each time a user selects a coordinate not substantially superimposing upon a UI control, the UI may render one or more supplemental controls and then store in a memory the supplemental control selected by the user. In such a fashion, the processing device may determine which UI controls the user most likely intended to select and, in the future, may provide supplemental controls corresponding to only those controls. For example, if a user whose selections not substantially superimposing upon a UI control tend to be very close (e.g., within one-eighth inch or closer) to that control, the UI may only render supplemental controls corresponding to controls very close to the selection (e.g., within one-eight or one-quarter inch). In such an embodiment, a processing device may render only supplemental control 321 corresponding to cancel button 320 in response to a user's selection of coordinate 370. Alternatively, if a user's selections tend to be more imprecise (e.g., only within a half inch or more in any direction), the UI may render supplemental controls corresponding to controls fairly far from the selection (e.g., within one-half to three-quarters inch in any direction). In such an embodiment, a processing device may render supplemental control 311 corresponding to text field 310, supplemental control 341 corresponding to submit button 340, and supplemental control 321 corresponding to cancel button 320 in response to a user's selection of coordinate 370. Of course, the processing device may determine which UI controls the user most likely indented to select based on any other selection characteristics. For example, if a user tends to select below UI controls, the processing device may optimally identify controls above the user's selection as those the user likely intended to select.

In still other embodiments, a UI may support multiple user profiles. For example, depending on who is logged into the UI, the UI may determine a proximate distance for identifying UI controls. Alternatively, the UI may predict the user using the UI based on selection characteristics, for example a touch gesture size, the general accuracy of the user in selecting controls, or the orientation of a user's selection in comparison to the control they intended to select.

Figure 5:
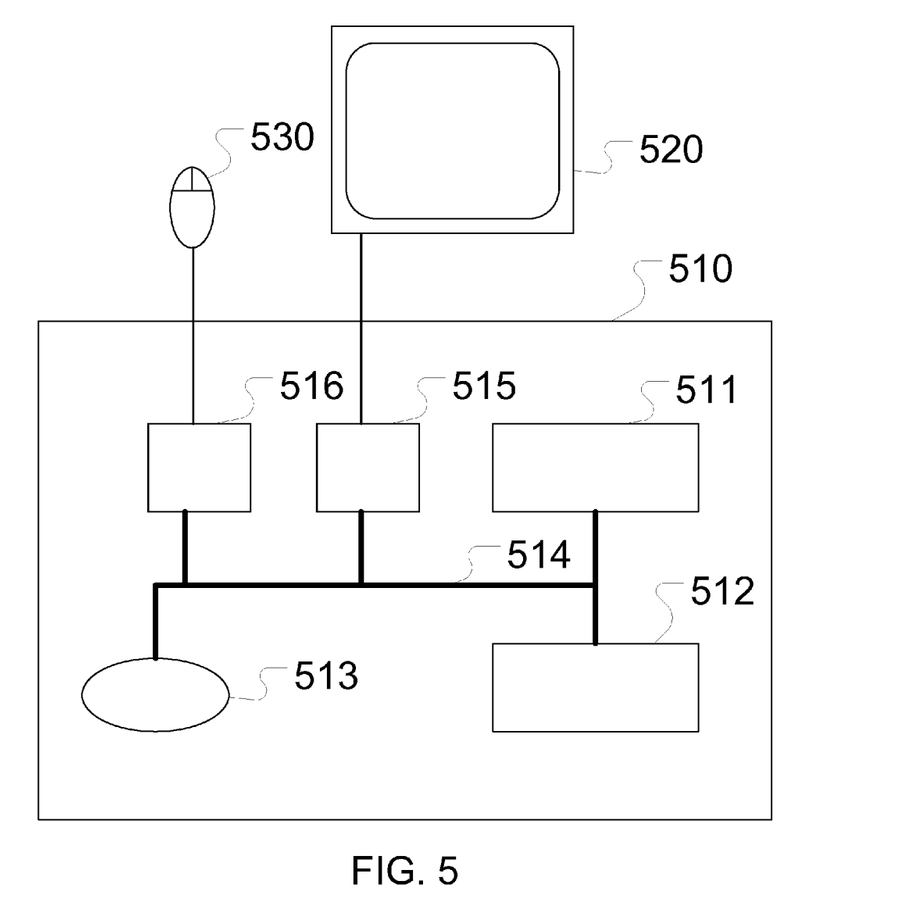
FIG. 5 illustrates an exemplary computing device for providing a UI to a user on a display device and for a user to interact with the UI through an input device.

A UI according to these embodiments may be implemented with software executed on computing device 510 of FIG. 5. Computing device 510 has one or more processing device 511 designed to process instructions, for example computer readable instructions stored on a storage device 513. By processing instructions, processing device 511 identifies controls proximate a user's selection and instructs a display device 520 to render supplemental controls. Storage device 513 may be any type of storage device (e.g., an optical storage device, a magnetic storage device, a solid state storage device, etc.), for example a non-transitory storage device. Alternatively, instructions may be stored in remote storage devices, for example storage devices accessed over a network or the Internet. Computing device 510 additionally has memory 512, an input controller 516, and an output controller 515. A bus 514 operatively connects components of computing device 510, including processor 511, memory 512, storage device 513, input controller 516, output controller 515, and any other devices (e.g., network controllers, sound controllers, etc.). Output controller 515 is operatively coupled (e.g., via a wired or wireless connection) to a display device 520 (e.g., a monitor, television, mobile device screen, touch-display, etc.) in such a fashion that output controller 515 can transform the display on display device 520 (e.g., in response to modules executed). Input controller 516 is operatively coupled (e.g., via a wired or wireless connection) to input device 530 (e.g., mouse, keyboard, touch-pad, scroll-ball, touch-display, etc.) in such a fashion that input can be received from a user (e.g., a user may select with input device 530 UI controls or handles displayed on display device 520).

Of course, FIG. 5 illustrates computing device 510, display device 520, and input device 530 as separate devices for ease of identification only. Computing device 510, display device 520, and input device 530 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.).

Embodiments may include software for a UI having touch-friendly controls. For example, computer-readable instructions may be stored on non-transitory storage device 513. The computer-readable instructions may be configured to be processed by processing device 511 to cause the processing device to receive user input through user interface device 530 (e.g., a touch-display), identify UI controls proximate the user's input, and render supplemental controls corresponding to the identified UI controls proximate the user's input on display device 520 to assist the user with selection of a UI control.

Figure 6:
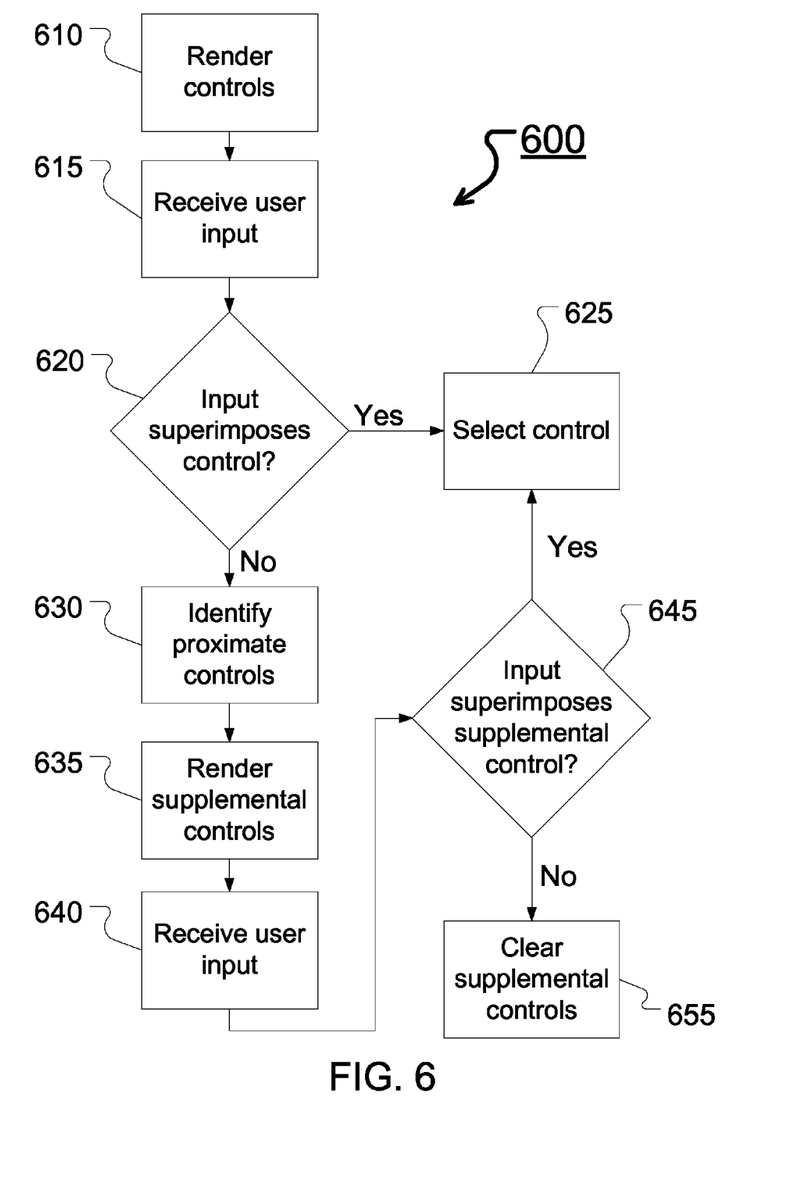
FIG. 6 illustrates an exemplary process for providing a touch-friendly UI.

FIG. 6 illustrates an exemplary computer-implemented method for providing a touch-friendly user interface. In step 610, UI controls are rendered on the UI in conventional fashion. In step 615, the UI receives a user's input, for example a touch gesture on a touch-display device. In step 620, a processing device determines whether the user's input substantially superimposes an interactible UI control (i.e., a UI control which accepts a mouse click or touch event). For example, a touch gesture may substantially superimpose an interactible UI control if it is within a determined number of pixels of the control (e.g., 10 pixels), within a certain distance of the control (e.g., within 1/32 or 1/8 of an inch of the control), or overlaps the control by a given percentage (e.g., 10% overlap). If the user's input substantially superimposes a UI control, the process proceeds to step 625 and the processing device selects the UI control. If not, the process proceeds to step 630 and a processing device identifies UI controls proximate the user's selection. In step 635, one or more supplemental controls, for example supplemental controls shown in FIGS. 2-4, are rendered corresponding to the identified UI controls. In step 640, the UI again receives a user's input, for example a touch gesture on a touch-display device. In step 645, a processing device determines whether the user's input substantially superimposes a supplemental control. If the user's input substantially superimposes a supplemental control, the process proceeds to step 625 and the processing device selects the UI control corresponding to the supplemental control. If not, the process may proceed to step 655 and clear the supplemental controls.

According to alternative embodiments, if a user's second selection does not substantially superimpose a supplemental control, the supplemental controls may remain rendered allowing the user to provide further input to select a supplemental control. In such embodiments, an additional UI control may be displayed that may allow a user to clear the supplemental controls, for example if the user inadvertently made a touch gesture when the user did not intend to select any control. Embodiments may also disable (i.e., lock) UI controls other than the supplemental controls, thus ensuring the user does not mistakenly select a UI control proximate a supplemental control.

While process 600 illustrates many independent steps, any or all of the steps may be combined or divided in embodiments. For example, software for performing process 600 may include modules for each step, may include fewer modules with one or more modules performing a plurality of steps, or may include additional modules further breaking down the steps. Process 600 may also include additional steps, for example steps for iteratively learning in response to a user's selections or touch-gestures.

Embodiments described herein include multiple supplemental controls, for example handles extending from UI controls as shown in FIG. 2 or supplemental controls separate from UI controls in FIG. 3. Of course, any other touch-friendly supplemental control may be used. Additionally, for mobile devices having both a touch screen and conventional buttons, for example the PALM PRE®, conventional buttons may allow a user to select a supplemental control. For example, a first supplemental control may be associated with a first button and a second supplemental control may be associated with a second button, so when two supplemental controls are rendered in response to a user's touch gesture proximate two UI controls, the user may select one of the UI controls by pressing the associated button.

Additionally, while the embodiments disclosed herein provide static supplemental controls, alternative supplemental controls may be animated. For example, supplemental controls may extend from UI controls in an animated fashion. Additionally, supplemental controls may increase in size over time, thus providing an increasingly large control for a user to select. Supplemental controls may also be continuously animated, for example having a pulsing appearance, thus allowing a user to easily and quickly realize the location of supplemental controls. Likewise, to enable a user to quickly and easily realize the location of controls, in addition to or in alternative to accentuating supplemental controls, characteristics of the remaining display may be altered, such as dimmed or grayed-out.

While embodiments described herein generally relate to mobile devices and touch-display mobile devices, these embodiments may be implemented on any computing device. For example, a conventional desktop computer may implement such a user interface to allow a user to easily select intended UI controls. This may be especially helpful for people whose ability to accurately select UI controls is reduced, for example due to handicap, injury, or age. Embodiments may be implemented on user interfaces that may receive input from user input devices other than a conventional mouse. For example, video game consoles having input received through controllers may provide controller-friendly supplemental controls to assist a user with UI interaction.

The invention has been described through embodiments. However, various modifications can be made without departing from the scope of the invention as defined by the appended claims and legal equivalents.

What is claimed is:

1. A computing device having a processor configured for executing instructions to provide a graphical interface for rendering on a display device, the graphical interface comprising:
   a first control to be rendered on the display device; and
   a second control to be rendered on the display device,
   wherein, based on receiving input through the graphical interface of a selection and determining that the input is within a proximity of at least one of the first control and the second control, the processor is further configured to render at least one supplemental control, the at least one supplemental control comprising:
      a first supplemental control having a first visual indicator identifying that the first supplemental control is associated with the first control, wherein the first supplemental control is configured for selecting the first control in response to a first selection input received via the first supplemental control; and
      a second supplemental control having a second visual indicator identifying that the second supplemental control is associated with the second control, wherein the second supplemental control is configured for selecting the second control in response to a second selection input received via the second supplemental control.

2. The computing device of claim 1, wherein, in response to receiving additional input through the graphical interface comprising a selection of one of the first supplemental control and the second supplemental control, the processor is further configured to select the respective control associated with the selected supplemental control.

3. The computing device of claim 2, wherein said proximity is a pre-defined size according to a size of a touch gesture.

4. The computing device of claim 3, wherein the pre-defined size is configured to be adjusted though an additional graphical interface.

5. The computing device of claim 3, wherein the computing device is configured to iteratively adjusts the proximity.

6. The computing device of claim 1, wherein the processor is further configured to:
   disable the first control and the second control in response to rendering the first supplemental control and the second supplemental control; and
   in response to receiving additional input through the graphical interface comprising a selection of one of the first supplemental control and the second supplemental control, enabling at least one of the first control and the second control.

7. The computing device of claim 1, wherein the first supplemental control has a first width or height greater than the first control and the second supplemental control has a second width or height greater than the second control.

8. The computing device of claim 1, wherein the first visual indicator comprises the first control and the first supplemental control being rendered with a first color or pattern and the second visual indicator comprises the second control and the second supplemental control being rendered with a second color or pattern different from the first color or pattern.

9. The computing device of claim 1, wherein the first visual indicator comprises a first connector rendered between the first control and the first supplemental control and the second visual indicator comprises a second connector rendered between the second control and the second supplemental control.

10. The computing device of claim 1, wherein the processor is further configured to render the first supplemental control at a distance from the second supplemental control, wherein the distance between the first supplemental control and the second supplemental control is greater than a distance between the first control and the second control.

11. A computer-implemented method for providing a graphical interface on a touch-display device, the method comprising:
   rendering a first control for display on the touch-display device;
   rendering a second control for display on the touch-display device;
   receiving input through the graphical interface of a touch gesture; and
   in response to receiving the input:
      determining that the input is within a proximity of at least one of the first control and the second control, said computing device renders, and rendering at least one supplemental control on the touch-display device corresponding to the touch gesture, wherein the at least one supplemental control comprises a visual indicator identifying that the at least one supplemental control is associated with one of the first control and the second control and wherein the at least one supplemental control is configured for selecting the associated control in response to a selection input received via the at least one supplemental control.

12. The method of claim 11, wherein the at least one supplemental control comprises:
a first supplemental control having a first visual indicator identifying that the first supplemental control is associated with the first control, wherein the first supplemental control is configured for selecting the first control in response to a first selection input received via the first supplemental control; and
a second supplemental control having a second visual indicator identifying that the second supplemental control is associated with the second control, wherein the second supplemental control is configured for selecting the second control in response to a second selection input received via the second supplemental control.

13. The method of claim 12, further comprising:
receiving additional input through the graphical interface of a touch gesture substantially superimposing one of the first supplemental control and the second supplemental control; and
in response to receiving the additional input, selecting the respective control associated with the selected supplemental control.

14. The method of claim 13, wherein the proximity is a pre-defined size according to a size of the touch gesture.

15. The method of claim 14, wherein the pre-defined size is configured to be adjusted through an additional graphical interface.

16. The method of claim 13, further comprising:
disabling the first control and the second control in response to rendering the first supplemental control and the second supplemental control; and
in response to receiving the additional input through the graphical interface comprising a selection of one the first supplemental control and the second supplemental control, enabling at least one of the first control and the second control.

17. The method of claim 11, wherein rendering the at least one supplemental control comprises:
identifying a first supplemental control having a first visual indicator identifying that the first supplemental control is associated with the first control, wherein the first supplemental control is configured for selecting the first control;
identifying a second supplemental control having a second visual indicator identifying that the second supplemental control is associated with the second control, wherein the second supplemental control is configured for selecting the second control;
determining that a previous input of a previous touch gesture through the graphical interface within the proximity of the first control and the second control resulted in a selection of the first supplemental control;
selecting the first supplemental control as the at least one supplemental control in response to determining that the previous input of the previous touch gesture within the proximity of the first control and the second control resulted in the selection of the first supplemental control; and
rendering the first supplemental control.

18. The method of claim 11, wherein determining that the input is within the proximity of at least one of the first control and the second control comprises:
identifying a first proximity value associated with a first profile and a second proximity value associated with a second profile, wherein the first proximity value is different from the second proximity value;
identifying that the touch-display device is accessed via the first profile;
selecting the first proximity value based on identifying that the touch-display device is accessed via the first profile;
setting the proximity to the first proximity value.

19. A product comprising computer-readable instructions stored on a non-transitory storage device, the computer-readable instructions configured to be executed by a processor to cause the processor to perform a method comprising:
rendering a first control in a graphical interface for display on a display device;
rendering a second control in the graphical interface for display on the display device;
receiving input through the graphical interface of a selection:
in response to receiving the input:
determining that the input is within a proximity of at least one of the first control and the second control, and
rendering at least one supplemental control on the display device, wherein the at least one supplemental control comprises a visual indicator identifying that the at least one supplemental control is associated with one of the first control and the second control and wherein the at least one supplemental control is configured for selecting the associated control in response to a selection input received via the at least one supplemental control.

20. The computer-readable instructions of claim 19, wherein the at least one supplemental control comprises:
a first supplemental control having a first visual indicator identifying that the first supplemental control is associated with the first control, wherein the first supplemental control is configured for selecting the first control in response to a first selection input received via the first supplemental control; and
a second supplemental control having a second visual indicator identifying that the second supplemental control is associated with the second control, wherein the second supplemental control is configured for selecting the second control in response to a second selection input received via the second supplemental control.

21. The computer-readable instructions of claim 16, wherein the computer-readable instructions are further configured to be processed by the processor to cause the processor to perform additional steps of the method comprising:
receiving additional input through the graphical interface of a selection of one of the first supplemental control and the second supplemental control;
in response to receiving the additional input, selecting the respective control associated with the selected supplemental control.

22. A computer-implemented method for providing a graphical interface on a touch-display device, comprising:
rendering at least one control for display on the touch-display device; and in response to receiving input of a selection through the graphical interface of the touch-display device:
    determining that the input is within a proximity of the at least one control,
    rendering at least one supplemental control for display on the touch-display device, wherein the at least one supplemental control comprises a visual indicator identifying that the at least one supplemental control is associated with the at least one control and the at least one supplemental control is configured for selecting the at least one control in response to a selection input received via the at least one supplemental control;
    receiving additional input through the graphical interface indicating a selection of the at least one supplemental control, and
    selecting the at least one control in response to the additional input selecting the at least one supplemental control.

23. A computer-implemented method for providing a graphical interface for display on a touch-display mobile device, comprising:

rendering a plurality of controls for display on the touch-display mobile device;

receiving a selection through the graphical interface;

identifying by a processing device, a subset of the plurality of controls corresponding to the selection;

rendering a plurality of supplemental controls corresponding to the subset of the plurality of controls for display on the touch-display mobile device, wherein each supplemental control includes a respective visual indicator identifying that the supplemental control is associated with a respective control and wherein each supplemental control is configured to select the respective control in response to an input received via the supplemental control;

receiving an additional selection of at least one of the plurality of supplemental controls through the graphical interface of the touch-display mobile device; and selecting a control associated with a selected one of the plurality of supplemental controls.

* * * * *